United States Patent
Judkins et al.

(10) Patent No.: US 10,186,769 B1
(45) Date of Patent: Jan. 22, 2019

(54) ELECTRONIC DEVICE WITH SHARED CONTROL AND POWER LINES FOR ANTENNA TUNING CIRCUITS

(71) Applicant: Apple Inc., Cupertino, CA (US)

(72) Inventors: James G. Judkins, Campbell, CA (US); Jing Zhu, Santa Clara, CA (US); Liang Han, Sunnyvale, CA (US); Matthew A. Mow, Los Altos, CA (US); Mattia Pascolini, San Francisco, CA (US); Ming-Ju Tsai, Sunnyvale, CA (US); Thomas E. Biedka, San Jose, CA (US); Victor C. Lee, Sunnyvale, CA (US); Xu Han, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 15/655,098

(22) Filed: Jul. 20, 2017

(51) Int. Cl.
- *H01Q 1/52* (2006.01)
- *H04B 1/04* (2006.01)
- *H04L 25/08* (2006.01)

(52) U.S. Cl.
CPC .......... *H01Q 1/521* (2013.01); *H04B 1/0475* (2013.01); *H04L 25/085* (2013.01)

(58) Field of Classification Search
CPC .................................................. H01Q 1/521
USPC ......................................................... 343/905
See application file for complete search history.

(56) References Cited

U.S. PATENT DOCUMENTS

| 4,381,566 A | 4/1983 | Kane |
| 5,699,054 A | 12/1997 | Duckworth |
| 6,907,234 B2 | 6/2005 | Karr et al. |
| 7,580,684 B2 | 8/2009 | Cyr et al. |
| 7,786,819 B2 | 8/2010 | Ella et al. |
| 8,803,474 B2 | 8/2014 | Hillan et al. |

(Continued)

FOREIGN PATENT DOCUMENTS

| CN | 1754313 | 3/2006 |
| CN | 202978926 | 6/2013 |

(Continued)

OTHER PUBLICATIONS

Parameswaran Sivalingam, et al. "Electronically Tunable Monopole Antenna Using Selective Capacitance Loading", Motorola, Inc., Apr. 15, 2008.

*Primary Examiner* — Andrea Lindgren Baltzell
(74) *Attorney, Agent, or Firm* — Treyz Law Group, P.C.; Michael H. Lyons

(57) ABSTRACT

An electronic device may be provided with control signal generation circuitry that generates a differential pair of control signals, power supply circuitry that generates a bias voltage, and an antenna having a tuning circuit. First switching circuitry may be coupled to the power supply circuitry and the control signal generation circuitry. Second switching circuitry may be coupled to the tuning circuit. A pair of control lines may be coupled between the first and second switching circuitry. In a first switching mode, the power supply circuitry may transmit the bias voltage to the tuning circuit over one of the control lines. The bias voltage may charge storage circuitry coupled to the tuning circuit. In a second switching mode, the control signal generation circuitry may transmit the differential pair of control signals to the tuning circuit. The tuning circuit may be powered by the storage circuitry in the second switching mode.

20 Claims, 6 Drawing Sheets

(56) References Cited

U.S. PATENT DOCUMENTS

| | | |
|---|---|---|
| 8,823,459 B2 | 9/2014 | Obkircher et al. |
| 8,938,026 B2 | 1/2015 | Premakanthan et al. |
| 8,971,874 B2 | 3/2015 | Han et al. |
| 9,041,617 B2 | 5/2015 | Sorensen et al. |
| 9,236,663 B2 | 1/2016 | Akhi et al. |
| 9,252,492 B2 | 2/2016 | Alrabadi et al. |
| 9,698,854 B2 | 7/2017 | Mow et al. |
| 2003/0119469 A1 | 6/2003 | Karr et al. |
| 2005/0184922 A1 | 8/2005 | Ida et al. |
| 2006/0176777 A1 | 8/2006 | Ihara |
| 2008/0305749 A1 | 12/2008 | Ben-Bassat |
| 2009/0073064 A1 | 3/2009 | Russo et al. |
| 2010/0302123 A1 | 12/2010 | Knudsen et al. |
| 2011/0260940 A1* | 10/2011 | Abe .................. H01Q 7/00 343/745 |
| 2013/0207870 A1* | 8/2013 | Lipowski ............. H01Q 1/38 343/852 |
| 2016/0174293 A1 | 6/2016 | Mow |

FOREIGN PATENT DOCUMENTS

| | | |
|---|---|---|
| DE | 2456206 | 8/1976 |
| EP | 0021762 | 1/1981 |
| EP | 1630960 | 3/2006 |
| GB | 2463536 | 3/2010 |
| TW | 201025730 | 7/2010 |

* cited by examiner

ELECTRONIC DEVICE WITH SHARED CONTROL AND POWER LINES FOR ANTENNA TUNING CIRCUITS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, the presence of conductive structures can influence antenna performance. For example, the presence of conductive housing structures or other device structures may limit the volume available for implementing antennas. This can adversely affect antenna bandwidth. Antenna tuning techniques performed by antenna tuning circuits may be used to compensate for limited antenna bandwidth. The antenna tuning circuits are controlled using a control interface.

However, as electronic devices get smaller and the number of frequency bands that are used to perform wireless communications increases over time, the amount of space available for the antenna tuning circuits and the control interface decreases. This may place the antenna tuning circuits and the control interface into close proximity with the antenna structures, leaving the antenna tuning circuits and the control interface vulnerable to radio-frequency electromagnetic interference from the antenna structures. Such electromagnetic interference can deteriorate the reliability of the wireless communications performed using the antenna structures.

It would therefore be desirable to be able to provide improved wireless circuitry for electronic devices such as improved antenna tuning circuitry.

SUMMARY

An electronic device may be provided with wireless circuitry. The wireless circuitry may include one or more antennas. A given antenna in the wireless circuitry may include electronic components such as tuning circuits that adjust the frequency response of the antenna. Each electronic component may include control inputs and a power supply input.

The wireless circuitry may include tuning control circuitry. The tuning control circuitry may include power supply circuitry and differential control signal generation circuitry. First switching circuitry may be coupled to the power supply circuitry and the differential control signal generation circuitry. Second switching circuitry may be coupled to the electronic component. A differential pair of control lines may be coupled between the first switching circuitry and the second switching circuitry.

The differential control signal generation circuitry may generate a differential pair of control signals. Control circuitry may adjust the first and second switching circuitry between a single-ended signal mode and a differential signal mode. In the single-ended signal mode, the power supply circuitry may transmit a power supply voltage to the electronic component over a given one of the pair of control lines. The power supply voltage may charge storage circuitry coupled to the power supply input of the electronic component. In the differential signal mode, the control signal generation circuitry may transmit the differential pair of control signals to the control inputs of the electronic component. The electronic component may be powered by the storage circuitry in the differential signal mode.

The differential pair of control signals may be immune to electromagnetic interference from high-magnitude radio-frequency fields generated by the antenna structures. Sharing the control lines between the power supply voltage and the differential pair of control signals may reduce the space and routing complexity required to control the electronic component.

DETAILED DESCRIPTION

Figure 1:
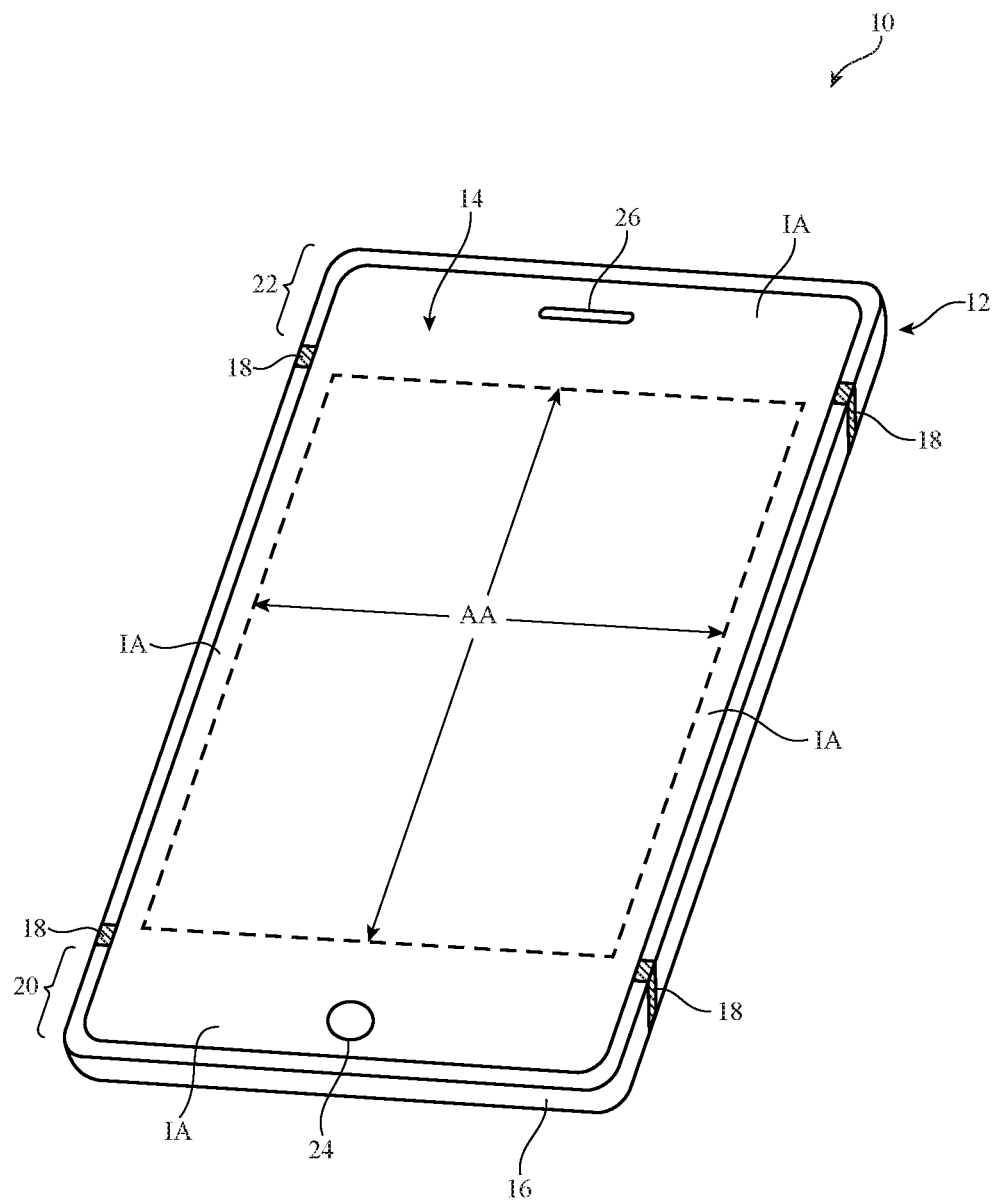
FIG. 1 is a perspective view of an illustrative electronic device with wireless communications circuitry in accordance with an embodiment.

An electronic device such as electronic device 10 of FIG. 1 may be provided with wireless communications circuitry. The wireless communications circuitry may include one or more antennas. Tunable circuits may be used to adjust the wireless communications circuitry. For example, the tunable circuits may be powered using a power supply voltage and may be controlled using control signals to tune the frequency response of a corresponding antenna. In order to mitigate radio-frequency noise on the control signals, the control signals may be conveyed to the tunable circuits using differential signal lines. In order to minimize the amount of conductive lines in the vicinity of the antenna, the control signals and the power supply voltage may both be conveyed to the tunable circuits over the same signal lines.

The antennas of the wireless communications circuitry can include loop antennas, inverted-F antennas, strip antennas, planar inverted-F antennas, monopole antennas, dipole antennas, monopole antennas, patch antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a keyboard, a gaming controller, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may be have slots that pass entirely through the rear housing wall and that therefore separate housing wall portions (and/or sidewall portions) of housing 12 from each other. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may have an array of pixels that form an active area AA that displays images for a user of device 10. An inactive border region such as inactive area IA may run along one or more of the peripheral edges of active area AA. Inactive area IA may be free of pixels for displaying images and may overlap circuitry and other internal device structures in housing 12. To block these structures from view by a user of device 10, the underside of the display cover layer or other layer in display 14 that overlaps inactive area IA may be coated with an opaque masking layer in inactive area IA. The opaque masking layer may have any suitable color.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16). Device 10 may also include conductive structures such as printed circuit boards, components mounted on printed circuit boards, and other internal conductive structures. These conductive structures, which may be used in forming a ground plane in device 10, may be located in the center of housing 12 and may extend under active area AA of display 14.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22. In configurations for device 10 with narrow U-shaped openings or other openings that run along the edges of device 10, the ground plane of device 10 can be enlarged to accommodate additional electrical components (integrated circuits, sensors, etc.).

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme, if desired.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
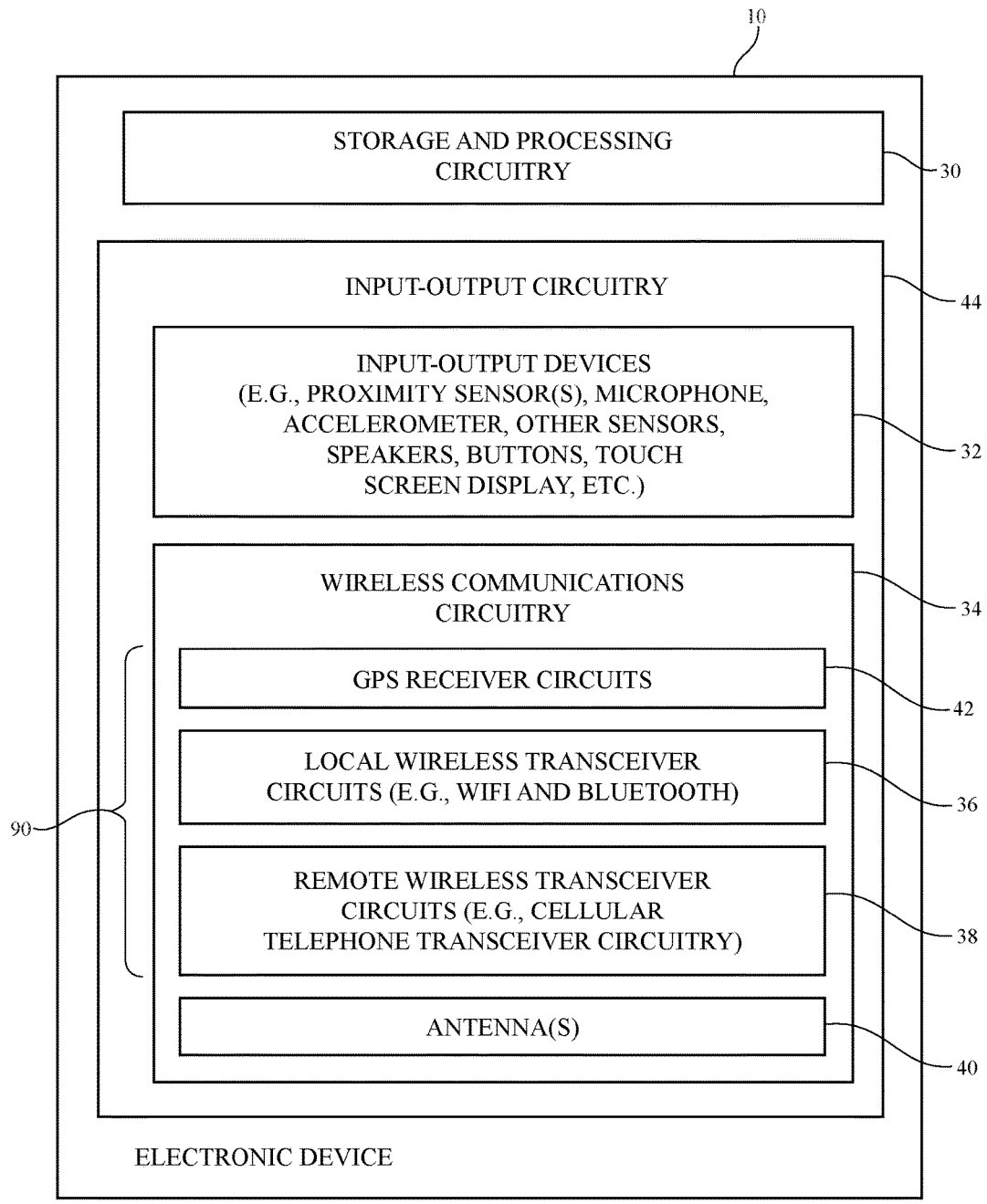
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band or other wireless personal area network and/or wireless local area network bands.

Circuitry 34 may use cellular telephone transceiver circuitry 38 for handling wireless communications in frequency ranges such as a low communications band from 600 to 960 MHz, a midband from 1710 to 2170 MHz, and a high band from 2300 to 2700 MHz or other communications bands between 600 MHz and 2700 MHz or other suitable frequencies between 600 MHz and 4000 MHz (as examples). Circuitry 38 may handle voice data and non-voice data.

Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc.

Wireless communications circuitry 34 may include satellite navigation system circuitry such as global positioning system (GPS) receiver circuitry 42 for receiving GPS signals at 1575 MHz or for handling other satellite positioning data (e.g., GLONASS signals at 1609 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles. Satellite navigation system signals for receiver 42 are received from a constellation of satellites orbiting the earth.

Wireless communications circuitry 34 may include one or more antennas 40. Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals).

Transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while the other antenna(s) may be switched out of use. If desired, control circuitry 30 may be used to select an optimum antenna to use in device 10 in real time and/or an optimum setting for tunable wireless circuitry associated with one or more of antennas 40. Sensors may be incorporated into device 10 to gather sensor data in real time that is used in adjusting antennas 40.

Figure 3:
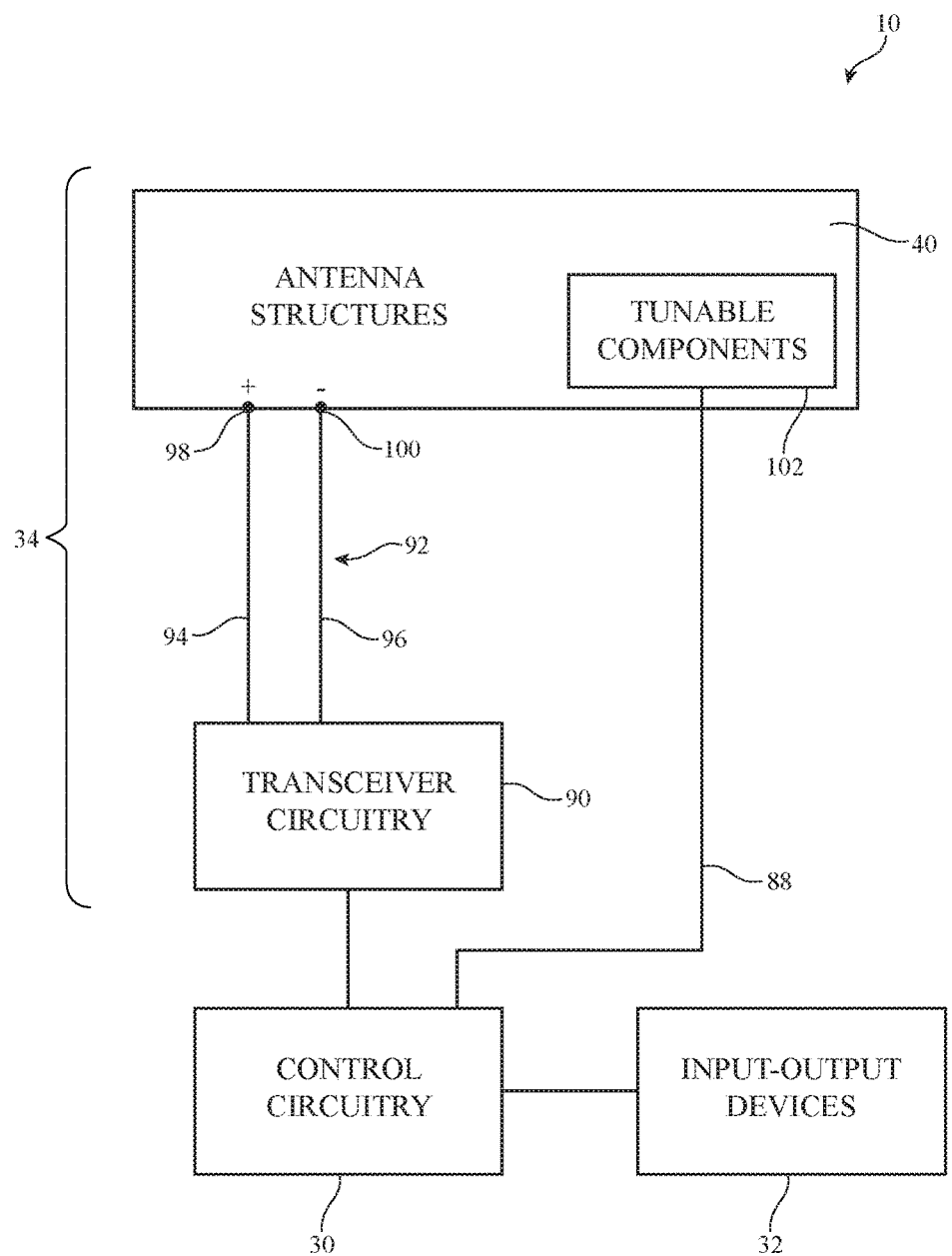
FIG. 3 is a schematic diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 30. Control circuitry 30 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 102 to tune antennas over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 30 may issue control signals on one or more paths such as path 88 that adjust inductance values, capacitance values, or other parameters associated with tunable components 102, thereby tuning antenna structures 40 to cover desired communications bands. Configurations in which antennas 40 are fixed (not tunable) may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). An impedance matching network (matching circuit) formed from components such as inductors, resistors, and capacitors may be used in matching the impedance of antenna structures 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna structures 40.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Tunable circuitry for an antenna may be incorporated into a tunable matching network (e.g., an adjustable impedance matching circuit coupled to feed terminals 98 and 100) and/or an antenna aperture tuner (e.g., tunable circuitry coupled to an antenna resonating element or other structure in an antenna that adjusts the resonant behavior of the antenna and therefore its frequency response). One or more integrated circuits may be used in implementing tunable circuits such as tunable inductors, tunable capacitors, switches for switching a desired inductor and/or capacitor into use and thereby adjusting an inductance or capacitance value for an antenna, etc. These integrated circuits may include sensors. Data from the sensors may be used in real time to determine how to make adjustments to the tunable circuits and how to make other wireless circuit adjustments.

Figure 4:
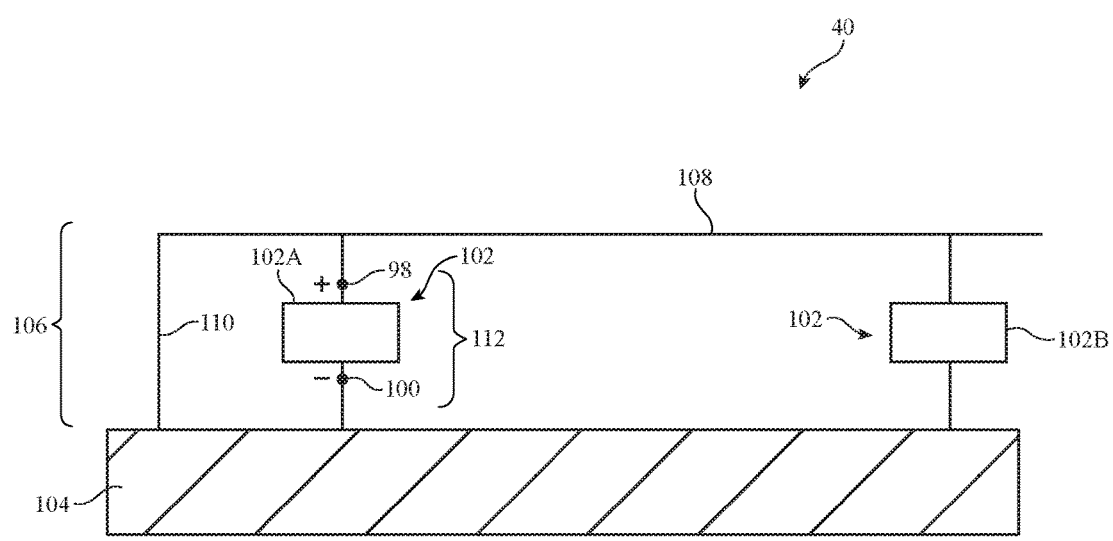
FIG. 4 is a diagram of an illustrative antenna having tuning circuits in accordance with an embodiment.

Tunable circuits and sensors may be incorporated into any suitable type of antenna (patch, loop, slot, planar inverted-F, inverted-F, an antenna that includes multiple antenna structures such as these, etc.). Consider as an example, an illustrative antenna such as inverted-F antenna 40 of FIG. 4. As shown in FIG. 4, inverted-F antenna 40 has antenna resonating element 106 and antenna ground (ground plane) 104. Antenna resonating element 106 may have a main resonating element arm such as arm 108 (e.g., arm 108 may be formed from a segment of peripheral structures 16 between two gaps 18 as shown in FIG. 1). The length of arm 108 may be selected so that antenna 40 resonates at desired operating frequencies. For example, the length of arm 108 may be a quarter of a wavelength at a desired operating frequency for antenna 40. If desired, inverted-F antennas such as illustrative antenna 40 of FIG. 4 may have more than one resonating arm branch (e.g., to create multiple frequency resonances to support operations in multiple communications bands). Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run parallel to return path 110 between arm 108 and ground 104. Antenna 40 of FIG. 4 may be a planar inverted-F antenna (e.g., arm 108 may have planar metal structures that run into the page in the orientation of FIG. 4) or may be formed from non-planar structures.

Antenna 40 include tunable components 102 such as tunable impedance matching circuit 102A and aperture tuning circuit 102B. Circuit 102B is coupled between arm 108 and ground 104 in the example of FIG. 4, but this is merely illustrative. Tunable circuits such as circuit 102B may be coupled within arm 108, may be interposed within return path 110, may form part of antenna ground 104, may be incorporated into a parasitic antenna resonating element, or may be incorporated into other antenna structures for antenna 40.

Circuit 102A and circuit 102B may be adjusted to adjust the performance of antenna 40 during operation of device 10. For example, the presence of an external object in the vicinity of antenna 40 may detune antenna 40. Using circuitry such as circuitry 102A and 102B, antenna 40 can be adjusted to compensate for loading experienced due to the presence of the external object. If desired, sensors may be incorporated into device 10 in wireless circuitry 34 to gather information on the operating conditions of antenna 40 and device 10. The sensors may include, for example, temperature sensors for monitoring the current operating temperature of antenna 40 and device 10, current monitoring circuitry for measuring antenna currents, voltage monitoring circuitry for monitoring antenna voltages, power monitoring circuitry for making antenna signal power measurements, and impedance measurement circuitry for making impedance measurements (e.g., impedance measurements on matching circuit 102A, impedance measurements on antenna 40, measurements of the impedance of a portion of antenna 40, etc.). Sensor data from the sensors may be used to adjust the operation of antenna 40 (e.g., tunable circuits 102A and 102B), and to make other adjustments to the operation of device 10 (e.g., output power adjustments, antenna port adjustments, modulation scheme adjustments, radio access technology adjustments, etc.).

The example of FIG. 4 is merely illustrative. Antenna 40 may be fed using two or more antenna feeds if desired. Arm 108 may have any desired shape (e.g., shapes that follow curved and/or straight paths, may extend across with width of device 10 from a left edge to a right edge of device 10, may include one or more bends, may have a planar dimension into and out of the page and that extends across the thickness of device 10, etc.). If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 108 may have left and right branches that extend outwardly from feed 112 and return path 206 (e.g., the left and right branches may each have ends that are defined by respective gaps 18 as shown in FIG. 1).

In one suitable arrangement, arm 108 of antenna 40 may be formed from portions of device housing 12 such as a segment of peripheral structures 16 that extends between two dielectric gaps 18 (FIG. 1). In order to provide an end user of device 10 with as large of a display as possible (e.g., to maximize an area of the device used for displaying media, running applications, etc.), it may be desirable to increase the amount of area at the front face of device 10 that is covered by active area AA of display 14 (FIG. 1). Increasing the size of active area AA may reduce the size of inactive area IA within device 10. This may reduce the volume that is available for forming antenna 40 (e.g., within regions 22 or 20 of device 10) and tunable circuits 102.

In general, antennas that are provided with larger operating volumes or spaces may have higher bandwidth efficiency than antennas that are provided with smaller operating volumes or spaces. As the size of active area AA increases, antenna tuning circuits 102 may allow antenna 40 to cover a larger bandwidth than would otherwise be available in the absence of tuning circuits 102 within the reduced available volume (e.g., within regions 20 or 22 of FIG. 1).

Antenna tuning circuits 102 may be controlled using tuning control signals and a power supply voltage provided by control circuitry (e.g., control circuitry 30 of FIG. 2 or other tuning control circuitry) over a control interface that includes conductive lines. However, if care is not taken, as the size of active area AA increases and the volume in which to form antenna 40 and tuning circuits 102 decreases, the radio-frequency signals conveyed by antenna 40 may interfere with the control signals provided to tuning circuits 102. In other words, as the volume of antenna 40 is reduced (e.g., the distance between arm 108 and ground 104 is reduced), if care is not taken, the radio-frequency electromagnetic fields generated by antenna 40 in the vicinity of tuning circuits 102 may interfere with the control and operation of tuning circuits 102, thereby deteriorating the wireless performance of antenna 40.

Figure 5:
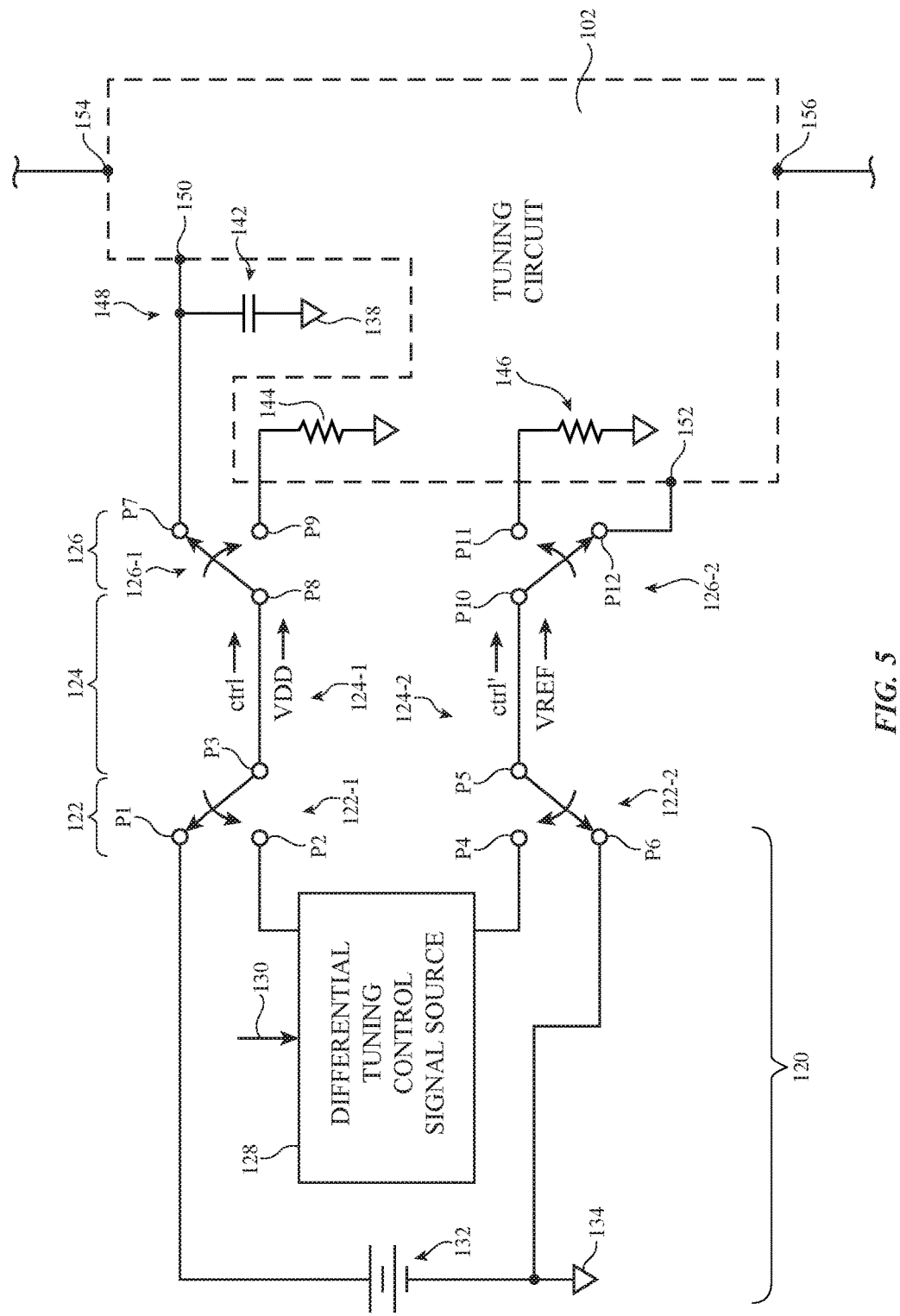
FIG. 5 is a circuit diagram of a tuning circuit and tuning control circuitry that conveys control signals and a power supply voltage to the tuning circuit over a differential signal path in accordance with an embodiment.

If desired, tuning circuits 102 (sometimes referred to herein as tuning components 102, tunable circuits 102, or tunable components 102) may be controlled using differential control signals provided over differential control lines in order to mitigate such radio-frequency interference on the control signals. FIG. 5 is a circuit diagram showing how tuning circuits 102 may be controlled using differential control signals provided over differential control lines.

As shown in FIG. 5, antenna tuning circuit 102 (e.g., an aperture tuning circuit such as circuit 102B or an impedance matching circuit such as circuit 102A of FIG. 4) may be controlled using tuning control circuitry 120 (sometimes referred to herein as tunable circuit control circuitry 120, tuner control circuitry 120, tuning controller 120, or tuner controller 120). Tuning control circuitry 120 may be formed from a portion of control circuitry 30 (FIGS. 2 and 3) or may be formed from separate control circuitry (e.g., a dedicated tuning controller integrated circuit).

Tuning circuit 102 may have a first radio-frequency terminal 154 and a second radio-frequency terminal 156. Tuning circuit 102 may convey radio-frequency signals for antenna 40 over terminals 154 and 156. As one example, radio-frequency terminal 154 may be coupled to positive feed terminal 98 and radio-frequency terminal 156 may be coupled to ground feed terminal 100 in scenarios where tuning circuit 102 forms impedance matching circuit 102A of FIG. 4. As another example, radio-frequency terminal 154 may be coupled to arm 108 and radio-frequency terminal 156 may be coupled to ground 104 in scenarios where tuning circuit 102 forms aperture tuning circuit 102B of FIG. 4. Radio-frequency terminals 154 and 156 may be coupled to any desired points within antenna 40, interposed on transmission line 92, or coupled between transmission line 92 and any desired point on antenna 40 (e.g., radio-frequency antenna signals (currents) conveyed by transmission line 92 and/or feed 112 may be conveyed between terminals 154 and 156 of tuning circuit 102).

Tuning circuit 102 may be adjusted using a pair of differential control signals ctrl/ctrl' (sometimes referred to herein as differential control signal pair ctrl/ctrl'). The differential pair of control signals may include a first signal ctrl received by control input P9 of tuning circuit 102 and a second control signal ctrl' received by control input P11 of tuning circuit 102. Tuning circuit 102 may be powered by power supply voltage VDD received over power supply terminal 150 (e.g., active circuitry such as switching circuitry in circuit 102 or register circuitry in circuit 102 may be powered using power supply voltage VDD received over power supply terminal 150) and a reference supply voltage (e.g., ground supply voltage) VREF received over reference (ground) terminal 152. Power supply voltage VDD may sometimes be referred to herein as bias voltage VDD or biasing voltage VDD and power supply terminal 150 may sometimes be referred to herein as power supply input 150, bias input 150, or biasing input 150.

Differential control signals ctrl and ctrl' may include, for example, differential clocking signals for clocking tuning circuit 102, differential interface input-output (I/O) voltages, and/or differential control data signals that instruct tuning circuit 102 to be placed into a particular state. Tuning circuit 102 may process the difference between control signals ctrl and ctrl' (e.g., using subtraction circuitry) and may use the difference between control signals ctrl and ctrl' to adjust the state of tuning circuit 102 so that tuning circuits 102 exhibit a selected impedance (e.g., desired capacitances, inductances, resistances, etc.) between radio-frequency terminals 154 and 156. Adjusting the impedances of tuning circuits 102 may, for example, adjust the frequency response or antenna efficiency of antenna 40.

In one example, differential control signals ctrl and ctrl' may identify a sequence of digital data bits corresponding to a particular state for tuning circuit 102 and that configures tuning circuit 102 to be placed into the corresponding state. If desired, tuning circuit 102 may include register circuitry that stores each tuning setting for tuning circuit 102 (e.g., where circuit 102 exhibits different impedances between radio-frequency terminals 154 and 156 when configured using each setting). The register circuitry may be clocked by differential clocking signals received over control inputs P9 and P11 and may be powered using power supply voltage VDD received over power supply input 150. Differential control signals ctrl and ctrl' may, for example, convey a series of digital data bits over control inputs P9 and P11 that identify which of the stored settings in the register to use at a given time and may configure tuning circuit 102 using that setting. The differential signal processing components (e.g., subtraction circuitry) and adjustable components (e.g., switching circuitry, register circuitry, etc.) within tuning circuit 102 that handle and are controlled by control signals ctrl and ctrl' are shown symbolically by load 144 coupled to control input P9 and load 146 coupled to control input P11 of FIG. 5. This example is merely illustrative and, in general, tuning circuit 102 may include any desired circuitry arranged in any desired manner.

Differential control signals ctrl and ctrl' may be generated by differential control signal generation circuitry such as differential tuning control signal generation circuitry 128 (sometimes referred to herein as differential tuning control signal source 128, differential control signal source 128, or differential control signal generation circuitry 128). Differential control signal generation circuitry 128 may generate the pair of differential control signals ctrl/ctrl' based on control input 130. Input 130 may include control signals received from other control circuitry on device 10, power management circuitry, or any other circuitry on device 10 that instruct source 128 to generate desired differential control signals.

Differential control signal generation circuitry 128 may be coupled to tuning circuit 102 over differential control lines 124 (e.g., a differential pair of conductive lines such as first conductive line 124-1 and second conductive line 124-2). Control line 124-1 may convey control signal ctrl to control input P9 on tuning circuit 102 and control line 124-2 may convey control signal ctrl' to control input P11 on tuning circuit 102. As lines 124 extend into the vicinity of antenna 40 (e.g., within the aperture of antenna 40 or the space between arm 108 and ground 104 of FIG. 4), radio-frequency signals conveyed by antenna 40 may affect (e.g., may interfere with or generate noise on) control signal ctrl on line 124-1 and control signal ctrl' on line 124-2 equally. Because tuning circuit 102 is adjusted (controlled) based on the difference between control signal ctrl, noise contributions due to radio-frequency interference on differential lines 124 may cancel out when processed by tuning circuit 102. In this way, tuning circuit 102 may be immune to electromagnetic noise or interference on lines 124.

Power supply voltage VDD and reference voltage VREF may be generated by power supply circuitry 132. Power supply circuitry 132 may sometimes be referred to herein as power source circuitry 132 or power source 132. Power supply circuitry 132 may include, for example, a battery and/or power management circuitry. In some scenarios, power supply voltage VDD and reference supply voltage VREF are provided to tuning circuit 102 over dedicated power and reference lines between power supply circuitry 132 and tuning circuit 102. However, as the volume allocated for antenna 40 in device 10 is reduced (e.g., to accommodate larger display active areas AA or other device components), providing voltages VDD and VREF to tuning circuit 102 using dedicated conductive lines can consume excessive space within device 10 and undesirably increase the routing complexity involved in controlling tuning circuits 102.

If desired, in order to minimize the routing complexity and space required to control tuning circuit 102, voltages VDD and VREF may be conveyed to tuning circuit 102 over the same differential signal lines 124 as differential control signals ctrl and ctrl'. In this example, tuning control circuitry 120 may include first switching circuitry such as a first set of switches 122 (e.g., a first switch 122-1 and a second switch 122-2). Switch 122-1 and switch 122-2 may be, for example, signal-pole single-throw (SPST) switches or any other desired switching circuits.

Switch 122-1 may have a first switch port (terminal) P1 coupled to a first side of power supply circuitry 132, a second switch port P2 coupled to differential control signal source 128, and a third switch port P3 coupled to control line 124-1. Switch 122-2 may have a first switch port P6 coupled to a second side of power supply circuitry 132 and reference potential (e.g., ground) 134, a second switch port P4 coupled to differential control signal source 128, and a third switch port P5 coupled to control line 124-2.

Switch 122-1 may be adjustable between a first state at which switch port P1 is shorted to switch port P3 and a second state at which switch port P2 is shorted to switch port P3. Switch 122-2 may be adjustable between a first state at which switch port P5 is shorted to switch port P6 and a second state at which switch port P5 is shorted to switch port P4. Switches 122 may, for example, be controlled using control signals provided by control signal generator 128, by control circuitry 30 (FIG. 2), or using any other desired control circuitry.

Second switching circuitry such as a second set of switches 126 (e.g., a first switch 126-1 and a second switch 126-2) may be coupled between differential control lines 124 and tuning circuit 102 (e.g., at or adjacent to the location of tuning circuit 102). Switch 126-1 may have a first switch port P8 coupled to signal line 124-1, a second switch port P7 coupled to power supply input 150 of tuning circuit 102, and a third switch port P9 is coupled to load 144 in tuning circuit 102 (e.g., switch port P9 may form the first control input of a differential control input pair for tuning circuit 102). Switch 126-2 may have a first switch port P10 coupled to signal line 124-2, a second switch port P12 coupled to ground terminal 152 of tuning circuit 102, and a third switch port P11 coupled to load 146 in tuning circuit 102 (e.g., switch port P11 may form a second control input of the differential control input pair for tuning circuit 102).

Switch 126-1 may be adjustable between a first state at which switch port P8 is shorted to switch port P7 and a second state at which switch port P8 is shorted to switch port P9. Switch 126-2 may be adjustable between a first state at which switch port P10 is shorted to switch port P12 and a second state at which switch port P10 is shorted to switch port P11. Switches 126 may, for example, be controlled using control signals provided by control signal generator 128, by control circuitry 30 (FIG. 2), or using any other desired control circuitry.

Switches 122 and 126 may be operable in a first mode or state (sometimes referred to herein as a differential signal mode or a control signal mode) or a second mode or state (sometimes referred to herein as a single-ended signal mode or power mode). In the control signal mode, switches 122-1, 122-2, 126-1, and 126-2 may each be each be placed in their respective second states (e.g., where switch port P2 is shorted to switch port P3, switch port P8 is shorted to switch port P9, switch port P5 is shorted to switch port P4, and switch port P10 is shorted to switch port P11). When configured in this way, control signal generator 128 may concurrently convey differential control signal ctrl through switch 122-1, over line 124-1, and through switch 126-1 to differential control input P9 of tuning circuit 102 and may convey differential control signal ctrl' through switch 122-2, over line 124-2, and through switch 126-2 to differential control input P11 of tuning circuit 102. Differential control signal pair ctrl/ctrl' may subsequently be used to control or adjust the state of tuning circuit 102 (e.g., to clock circuit 102, to select a desired register setting, etc.).

In the power mode, switches 122-1, 122-2, 126-1, and 126-2 may each be each be placed in their respective first states (e.g., where switch port P1 is shorted to switch port P3, switch port P8 is shorted to switch port P7, switch port P5 is shorted to switch port P6, and switch port P10 is shorted to switch port 12). When configured in this way, power supply circuitry 132 may concurrently convey power supply voltage VDD through switch 122-1, over line 124-1, and through switch 126-1 to power supply input 150 of tuning circuit 102 and may convey reference voltage VREF through switch 122-2, over line 124-2, and through switch 126-2 to reference voltage terminal 152 of tuning circuit 102. The power supply and reference voltages may be used to power tuning circuit 102. Because voltages VDD and VREF are single-ended signals, lines 124-1 and 124-2 may serve as single-ended control lines and do not serve as a differential pair of control lines when the switches are operated in the power (single-ended signal) mode.

In order to power tuning circuit 102 when switches 122 and 126 are in the differential signal mode (e.g., the control signal mode), charge storage circuitry 148 may be coupled between switch port P7 and power supply terminal 150 of tuning circuit 102. In the example of FIG. 5, charge storage circuitry 148 includes a charge storage capacitor 142 coupled between the path between switch port P7 and terminal 150 and reference terminal (e.g., ground) 138. This is merely illustrative and, in general, charge storage circuitry 148 may include any desired circuitry for storing charge.

When switches 122 and 126 are placed in the single-ended signal mode, power supply voltage VDD may be stored on charge storage circuitry 148 (e.g., on capacitor 142) while powering tuning circuit 102 through input 150. When switches 122 and 126 are placed in the control signal mode, the charge stored on storage circuitry 148 may discharge and may be received at input terminal 150 for powering tuning circuit 102. In this way, tuning circuit 102 may be powered while receiving differential control signals ctrl/ctrl' over control lines 124-1 and 124-2 even though circuit 102 has been temporarily decoupled from power supply circuitry 132. If desired, switches 122 and 126 may alternate between the differential signal mode and the single-ended signal mode over time to recharge storage circuitry 148 so that tuning circuit 102 is always powered at any given moment of time.

In this way, tuning circuit 102 may be controlled to provide a desired impedance between radio-frequency terminals 154 and 156 (e.g., in a selected state as dictated by control signals ctrl/ctrl') without incurring electromagnetic interference due to the close proximity of lines 124 and circuit 102 to the resonating element and feed of antenna 40. In addition, the space and conductive routing complexity required to power tuning circuit 102 may be less than in scenarios where tuning circuit 102 is powered over dedicated power supply lines (e.g., by a factor of five or more) and tuning circuit 102 may be powered even when power supply input 150 is decoupled from power supply 132.

Figure 6:
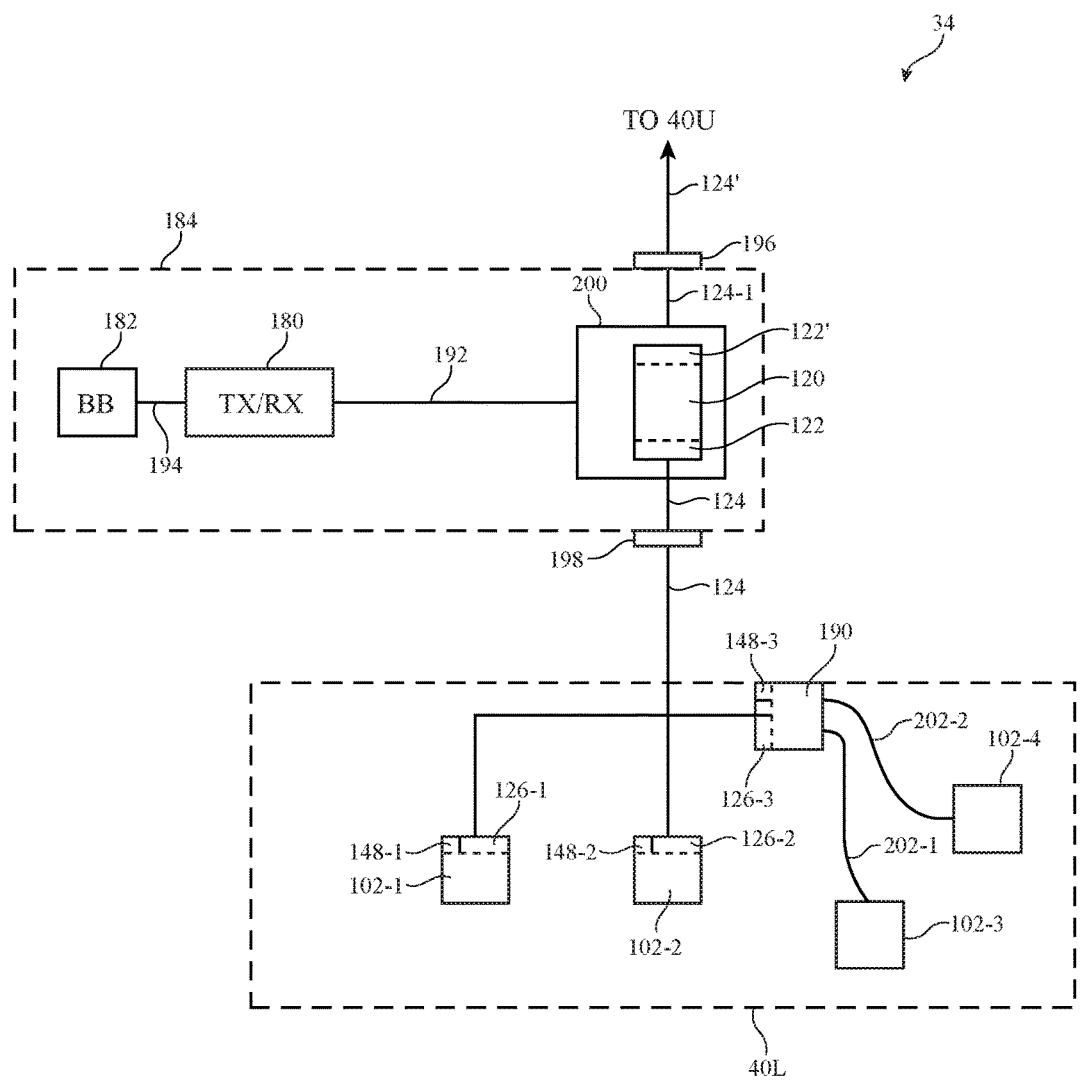
FIG. 6 is a diagram showing how tuning control circuitry may convey control signals and a power supply voltage to multiple tuning circuits in an electronic device in accordance with an embodiment.

If desired, tuning control circuitry 120 may be used to control multiple tuning circuits 102 in device 10 over one or more pairs of differential control lines. FIG. 6 is a diagram showing an example of how tuning control circuitry 120 may control multiple tuning circuits 102 using differential control signals and single-ended power supply signals.

As shown in FIG. 6, tuning control circuitry 120 may be formed within bridge circuitry 200 of wireless circuitry 34. Bridge circuitry 200 may be coupled to transceiver circuitry 180 over control bus 192. Transceiver circuitry 180 may be coupled to baseband circuitry 182 over path 194. Transceiver circuitry 180 may include transceiver circuitry 90 (FIG. 3) or may include other transceiver circuitry if desired. Transceiver circuitry 192 may convey tuning control signals to tuning controller 120 on bridge 200 via bus 192 (e.g., as input 130 to differential control signal generation circuitry 128 of FIG. 5). In one suitable arrangement, transceiver 192 may convey control signals such as radio-frequency front end (RFFE) control signals (e.g., control signals compliant with the MIPI® Alliance radio-frequency front end specification) to bridge 200 via control bus 192 (e.g., an RFFE bus). In this scenario, bridge 200 may include RFFE-to-differential bus converter circuitry that converts the RFFE signals to differential signals ctrl/ctrl'. If desired, differential control signal generator 128 may include RFFE-to-differential bus converter circuitry that converts the RFFE control signals to generate differential signals ctrl/ctrl' in this scenario. Other types of serial and parallel control lines may be used for bus 192 if desired.

In the example of FIG. 6, baseband processor 182, transceiver 180, and bridge 200 are formed on the same substrate 184 (e.g., a main logic board for device 10, a rigid or flexible printed circuit board, package substrate, integrated circuit, or other substrate). If desired, baseband 182, transceiver 180, and bridge 200 may be formed on one or more integrated circuits mounted to substrate 184. Tuning control circuitry 120 may be formed external to bridge 200 if desired.

Tuning control circuitry 120 may be coupled to multiple antennas 40 such as a first antenna 40L (e.g., a lower antenna formed in region 20 at the lower end of device 10 as shown in FIG. 1) and a second antenna 40U (e.g., an upper antenna formed in region 22 at the upper end of device 10 as shown in FIG. 1) via respective differential control lines. Tuning control circuitry 120 may include respective switching circuitry for each pair of differential control lines. In the example of FIG. 6, control signal generator circuitry 128 (FIG. 5) in tuning control circuitry 120 may be coupled to lower antenna 40U via switching circuitry 122, a first pair of differential signal lines 124, and board-to-board connector 198 (e.g., in scenarios where bridge 200 is formed on substrate 184). Signal generator circuitry 128 may be coupled to upper antenna 40U via switching circuitry 122', a second pair of differential signal lines 124', and board-to-board connector 196.

If desired, the same pair of differential signal lines 124 may be coupled to multiple tuning circuits 102 in lower antenna 40L. As shown in FIG. 6, antenna 40L may include a first tuning circuit 102-1, a second tuning circuit 102-2, a third tuning circuit 102-3, and a fourth tuning circuit 103-4 (e.g., aperture tuning circuits 102B and/or impedance matching circuits 102A as shown in FIG. 4). In one suitable arrangement, tuning circuits 102-1, 102-3, and 102-4 may include adjustable inductor circuits (e.g., circuit 102-1 may include a four inductors coupled to a single-pole four-throw (SP4T) switch, circuit 102-3 may include an inductor coupled to a single-pole single-throw switch, circuit 102-4 may include two inductors coupled to a single-pole double-throw (SP2T) switch, etc.) whereas tuning circuit 102-2 includes an adjustable capacitor circuit. This is merely illustrative and, in general, circuits 102-1, 102-2, 102-3, and 102-4 may include any desired components. Antenna 40L may include fewer than four tuning circuits 102 or more than four tuning circuits 102. Tuning circuits 102-1, 102-2, 102-3, and 102-4 may be formed on separate substrates (e.g., rigid or flexible printed circuits) or two or more of circuits 102-1, 102-2, 102-3, and 102-4 may be formed on the same substrate (e.g., a rigid or flexible printed circuit).

Differential signal lines 124 may be coupled to tuning circuit 102-1 via a first set of switches 126 (e.g., switches 126-1). Lines 124 may be coupled to tuning circuit 102-2 via second set of switches 126-2. Tuning controller 120 may convey differential control signals ctrl/ctrl' to both tuning circuits 102-1 and 102-2 while switches 122, switches 126-1, and switches 126-2 are in the control signal (differential signal) mode to control the states of components 102-1 and 102-2 and thus the response of antenna 40L. Tuning control circuitry 120 may convey power supply voltage VDD and reference voltage VREF to tuning circuits 102-1 and 102-2 while switches 122, switches 126-1, and switches 126-2 are in the power (single-ended signal) mode. Corresponding charge storage circuits 148 at tuning circuits 102-1 and 102-2 (e.g., charge storage circuit 148-1 at tuning circuit 102-1 and charge storage circuit 148-2 at tuning circuit 102-2) may store charge corresponding to power supply voltage VDD for powering circuits 102-1 and 102-2 when switches 126-1, 122, and 126-2 are in the control signal mode.

If desired, differential control lines 124 may be coupled to circuits (e.g., electronic components) in antenna 40L that do not tune antenna 40 such as converter circuitry. In one example, lines 124 may control converter circuitry at antenna 40 such as converter circuitry that converts control signals ctrl/ctrl' to other control protocols, to single-ended control signals, or other control formats. For example, antenna 40L may include converter or interfacing circuitry such as converter circuity 190 (sometimes referred to as interface circuitry 190). Converter circuitry 190 may convert differential control signals ctrl/ctrl' received over lines 124 (e.g., while switches 126-3 and 122 are in the control mode) to a different control protocol or to single-ended control signals. In one suitable arrangement, converter circuitry 190 may include general purpose output (GPO) converter circuitry that converts differential control signals ctrl/ctrl' to general purpose output (GPO) control signals or other single-ended control signals that are used to control the states of tuning circuits such as tuning circuits 102-3 and 102-4. Converter (interface) circuitry 190 may be powered using charge stored on storage circuitry 148-3 while switching circuitry 122 and 126-3 are in the power mode, for example.

The example of FIG. 6 is merely illustrative. If desired, other electronic components such as sensor circuitry (e.g., impedance sensor circuitry, temperature sensor circuitry, current sensor circuitry, etc.) may be coupled to differential control path 124, may be coupled to corresponding switching circuitry 126 and charge storage circuitry 148, and may be controlled and powered using differential control signals ctrl/ctrl' and power supply voltages generated by tuning control circuitry 120 (e.g., tuning circuit 102 as shown in FIG. 5 may be replaced by sensor circuitry, converter circuitry, or any other desired circuitry associated with the operation of antenna 40 or device 10 and may be controlled and powered using signals received from tuning controller 120 over the same differential signal lines 124). Similar circuitry may be formed at upper antenna 40U for control over differential line 124. Tuning control circuitry 120 may be used to control components in more than two antennas or in only one of antennas 40U and 40L. If desired, separate tuning control circuits 120 may be used to control components in multiple antennas 40.

In this way, antenna components such as circuits 102-1, 102-2, 102-3, 190, and 102-4 may be controlled by tuning controller 120 without electromagnetic interference caused by the components' close proximity to antenna 40L and without requiring separate, space-consuming, power lines for powering the components (e.g., because any electromagnetic interference in control signal ctrl is canceled out by interference on control signal ctrl' when processed by components 102). The associated reduction in control routing complexity may allow more space within device 10 to be used by other device components such as active region AA of display 14 without affecting the tuning and radio-frequency performance of antennas 40.

Control circuitry in device 10 may be configured to perform operations in device 10 using hardware (e.g., dedicated hardware or circuitry), firmware and/or software. Software code for performing operations (e.g., radio-frequency communications and antenna tuning operations performed by tuning controller 120) in device 10 is stored on non-transitory computer readable storage media (e.g., tangible computer readable storage media) in control circuitry 30 and/or 100. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 30 and/or 100. The processing circuitry may include application-specific integrated circuits with processing circuitry, one or more microprocessors, a central processing unit (CPU) or other processing circuitry.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   antenna structures that convey wireless signals;
   a tuning circuit coupled to the antenna structures;
   control signal generation circuitry configured to generate first and second control signals, wherein the first and second control signals form a differential pair of control signals;
   power supply circuitry configured to generate a power supply voltage; and
   first and second conductive lines coupled between the tuning circuit and the control signal generation circuitry, wherein the first conductive line is configured to convey the first control signal and the power supply voltage to the tuning circuit, the second conductive line is configured to convey the second control signal to the tuning circuit, and the tuning circuit is configured to adjust the antenna structures based on the differential pair of control signals.

2. The apparatus defined in claim 1, further comprising:
   a first switch having a first switch port coupled to the power supply circuitry, a second switch port coupled to the control signal generation circuitry, and a third switch port coupled to the first conductive line.

3. The apparatus defined in claim 2, wherein the tuning circuit comprises a power supply input and a control input, further comprising:
   a second switch having a fourth switch port coupled to the first conductive line, a fifth switch port coupled to the power supply input, and a sixth switch port coupled to the control input.

4. The apparatus defined in claim 3, wherein the power supply circuitry is configured to transmit the power supply voltage to the power supply input over the first and second switches and the first conductive line while the first and second switches are in a first state at which the first switch port is shorted to the third switch port and the fourth switch port is shorted to the fifth switch port.

5. The apparatus defined in claim 4, further comprising:
   charge storage circuitry coupled between the fifth switch port of the second switch and the power supply input of the tuning circuit.

6. The apparatus defined in claim 5, wherein the charge storage circuitry comprises a capacitor.

7. The apparatus defined in claim 5, wherein the control signal generation circuitry is configured to transmit the first control signal to the control input over the first and second switches and the first conductive line while the first and second switches are in a second state at which the second switch port is shorted to the third switch port and the sixth switch port is shorted to the fourth switch port.

8. The apparatus defined in claim 7, wherein the charge storage circuitry is configured to store charge corresponding to the power supply voltage while the first and second switches are in the first state and to power the tuning circuit via the power supply input while the first and second switches are in the second state.

9. The apparatus defined in claim 7, wherein the tuning circuit comprises a reference input and an additional control input, further comprising:
 a third switch having a seventh switch port coupled to the power supply circuitry, an eighth switch port coupled to the control signal generation circuitry, and a ninth switch port coupled to the second conductive line; and
 a fourth switch having a tenth switch port coupled to the second conductive line, an eleventh switch port coupled to a reference terminal on the tuning circuit, and a twelfth switch port coupled to the control input, wherein the third switch is configured to short the seventh switch port to the ninth switch port and the fourth switch is configured to short the tenth switch port to the eleventh switch port when the first and second switches are in the first state, and the third switch is configured to short the eighth switch port to the ninth switch port and the fourth switch is configured to short the twelfth switch port to the tenth switch port while the first and second switches are in the second state.

10. The apparatus defined in claim 3, wherein the antenna structures comprise:
 an antenna resonating element arm;
 an antenna ground; and
 an antenna feed having a first feed terminal coupled to the antenna resonating element arm and a second feed terminal coupled to the antenna ground, wherein the tuning circuit has a first radio-frequency terminal coupled to the antenna resonating element arm and a second radio-frequency terminal coupled to the antenna ground.

11. An electronic device, comprising:
 antenna structures;
 an electronic component coupled to the antenna structures;
 differential control signal generation circuitry that generates a differential pair of control signals;
 power supply circuitry that generates a bias voltage;
 switching circuitry coupled to the power supply circuitry and the differential control signal generation circuitry;
 a pair of control lines coupled between the switching circuitry and the tunable component; and
 control circuitry, wherein the control circuitry is configured to adjust the switching circuitry between a differential signal mode in which the differential control signal generation circuitry transmits the differential pair of control signals to the electronic component over the pair of control lines and a single-ended signal mode in which the power supply circuitry transmits the bias voltage to the electronic component over one of the control lines in the pair of control lines.

12. The electronic device defined in claim 11, wherein the electronic component comprises a tunable component configured to adjust the antenna structures based on the differential pair of control signals.

13. The electronic device defined in claim 11, wherein the electronic component comprises a converter that is configured to convert the differential pair of control signals to a different control signal format and that is powered using the bias voltage.

14. The electronic device defined in claim 11, wherein the electronic component comprises an impedance sensor that is configured to gather impedance information associated with the antenna structures and that is controlled using the differential pair of control signals and powered using the bias voltage.

15. The electronic device defined in claim 11, further comprising:
 additional switching circuitry coupled between the pair of control lines and the electronic component, wherein the control circuitry is configured to adjust the additional switching circuitry between the differential signal mode and the single-ended signal mode.

16. The electronic device defined in 11, further comprising:
 charge storage circuitry coupled to the electronic component, wherein the charge storage circuitry is configured to store charge associated with the bias voltage when the switching circuitry is in the single-ended signal mode and the charge storage circuitry is configured to power the electronic component when the switching circuitry is in the differential signal mode.

17. The electronic device defined in claim 11, wherein the pair of control lines are decoupled from the power supply circuitry when the switching circuitry is in the differential-signal mode and the pair of control lines are decoupled from the differential control signal generation circuitry when the switching circuitry is in the single-ended signal mode.

18. An electronic device, comprising:
 an antenna having an antenna resonating element, an antenna ground, an antenna feed coupled between the antenna resonating element and the antenna ground, and a tunable component configured to tune a frequency response of the antenna;
 tuning control circuitry configured to generate a differential pair of control signals and a power supply voltage;
 a pair of control lines coupled to the tuning control circuitry;
 switching circuitry coupled between the pair of control lines and the tunable component; and
 control circuitry, wherein the control circuitry is configured to adjust the switching circuitry between a first state at which the tunable component receives the differential pair of control signals from the tuning control circuitry over the pair of control lines and a second state at which the tunable component receives the power supply voltage over a given one of the control lines in the pair of control lines.

19. The electronic device defined in claim 18, further comprising:
 a radio-frequency transceiver coupled to the tuning control circuitry and configured to generate a single-ended control signal, wherein the tuning control circuitry comprises converter circuitry that is configured to receive the single-ended control signal and to generate the differential pair of control signals based on the single-ended control signal.

20. The electronic device defined in claim 19, wherein the tunable component comprises a register that is powered using the power supply voltage and that stores settings for the tunable component, and the tunable component is configured to implement a selected setting stored on the register based on the differential pair of control signals.

* * * * *